March 21, 1950 R. T. CLARKE 2,501,160
LIGHTING SYSTEM FOR DISPLAY MODELS
Filed March 3, 1947 2 Sheets-Sheet 1
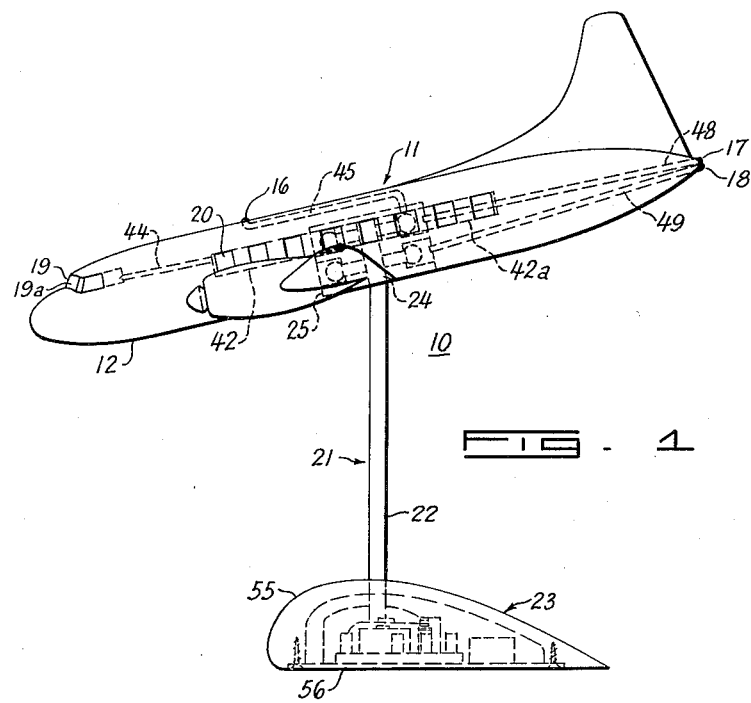
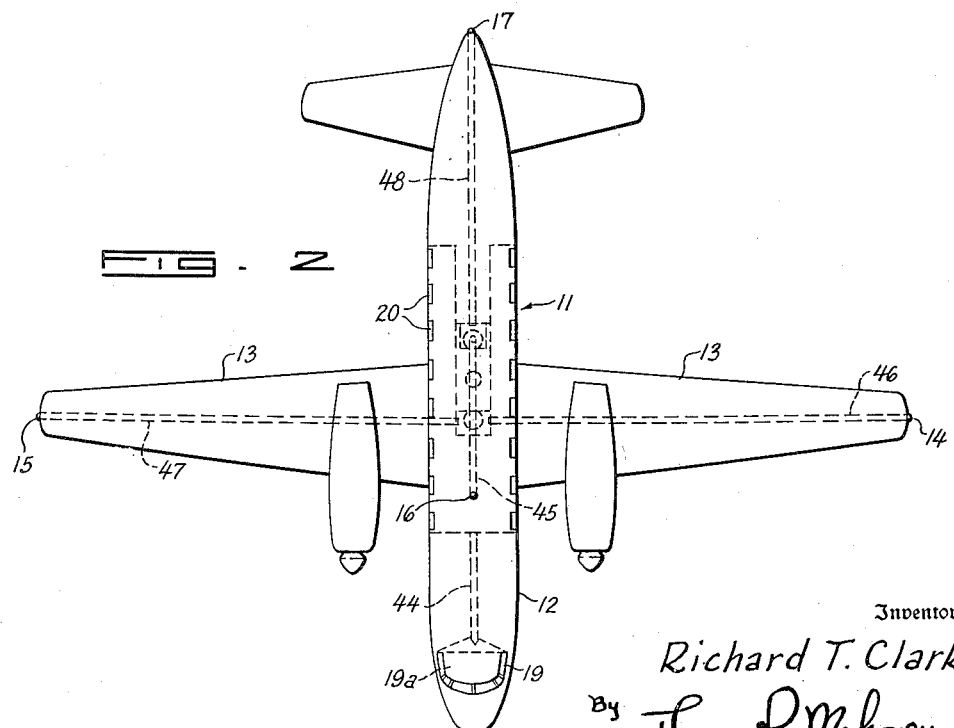
Inventor
Richard T. Clarke
By Thomas P. Mahoney March 21, 1950          R. T. CLARKE          2,501,160
LIGHTING SYSTEM FOR DISPLAY MODELS
Filed March 3, 1947          2 Sheets—Sheet 2
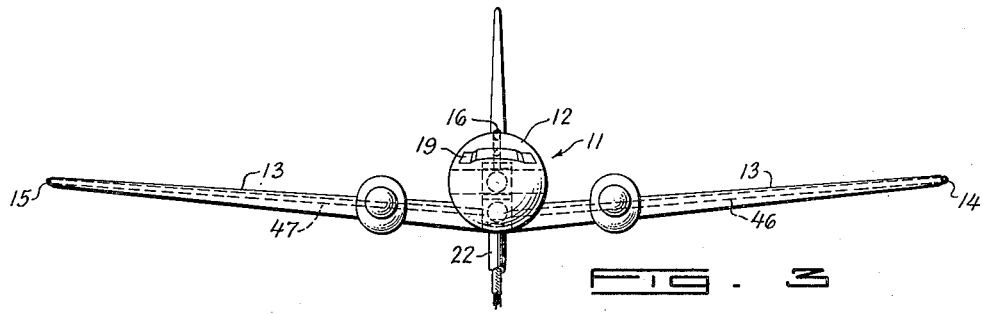
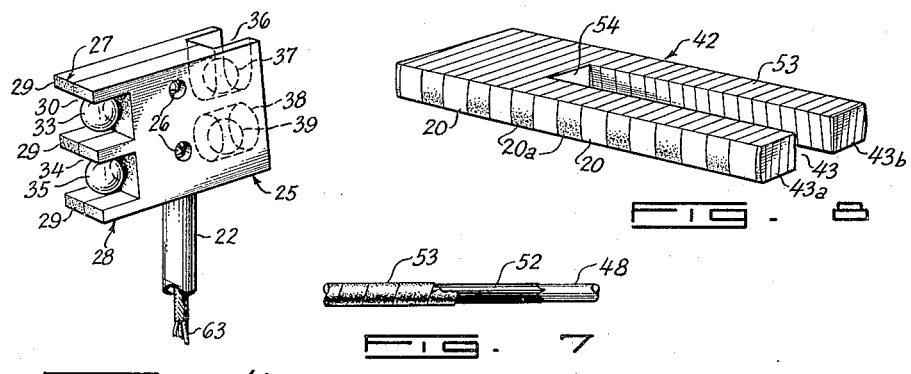
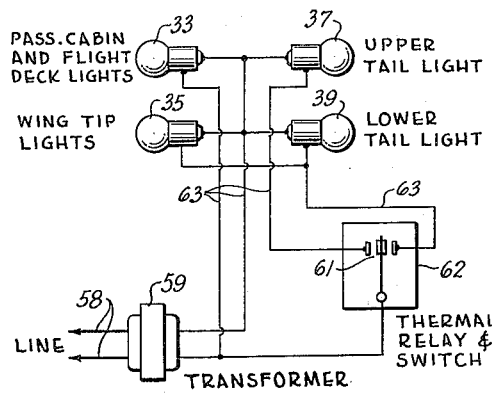
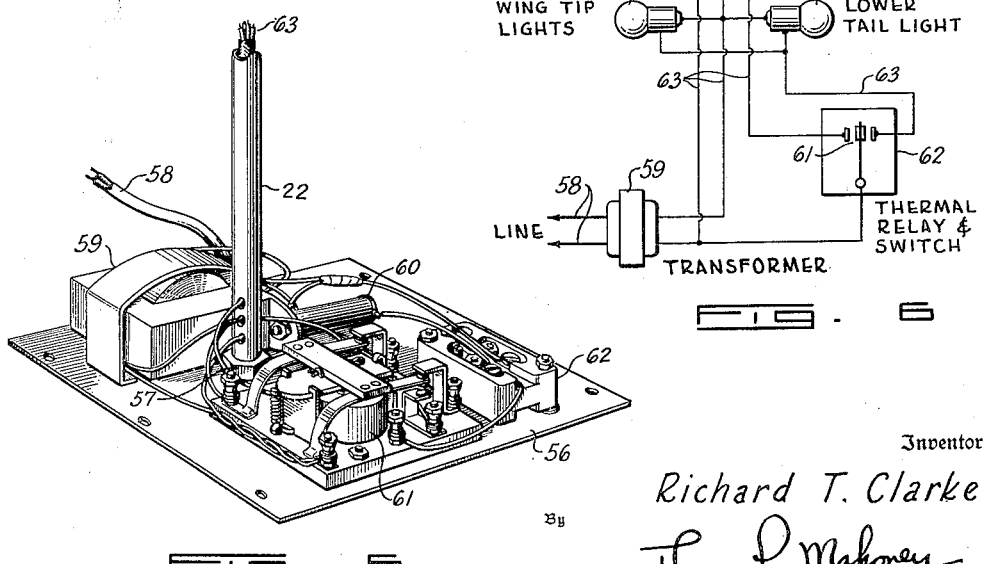
Inventor
Richard T. Clarke
By Thomas P. Mahoney Patented Mar. 21, 1950

2,501,160

UNITED STATES PATENT OFFICE 2,501,160

LIGHTING SYSTEM FOR DISPLAY MODELS

Richard Talbot Clarke, Coronado, Calif., assignor to Consolidated Vultee Aircraft Corporation, San Diego, Calif., a corporation of Delaware Application March 3, 1947, Serial No. 731,913

2 Claims. (Cl. 40—126)

1

This invention relates to improvements in display devices and more particularly to display devices which comprise a central lighting source and have embodied therein light-conductive elements adapted to conduct the light from said central lighting source to remote and widely distributed points in the display device.

A difficulty encountered in the construction of display devices and electrically lighted replicas of vehicles such as aircraft is the simulation of electric running lights on a scale which will be in harmony with the overall size of the replica. For instance, in the construction of the airplane model which embodies the basic features of the present invention it was impossible to secure incandescent bulbs which would accurately simulate the intensity and size of the actual running lights of the aircraft.

To eliminate such difficulties the present invention provides a central lighting source housed in the model which is to be illuminated. Light-conductive members or elements running from the central lighting source through the body of the model or replica channel the light to remote points in the model. Thus, it is possible to create lighting arrangements which are of a scale harmonious to the general configuration and size of the model itself.

It is, therefore, one object of this invention to provide a display airplane model lighting system which will permit the display to be lighted from a central source through means adapted to convey the light from the central source to points remote from that source.

It is another object of this invention to provide a lighting system for airplane models constructed on a small scale which will permit the simulation of lighting arrangements on a scale harmonious with the overall scale of the model itself.

A further object of the invention is the provision of a lighting system for display airplane models which will eliminate the need for the utilization of incandescent bulbs at the points where incandescent bulbs cannot practicably be used because of the scale of the model.

An additional object of this invention is the provision of a lighting system for display airplane models which is simple in construction and design and which can be embodied in the model at the time the model is formed or constructed.

A further object of this invention is the provision of a lighted display airplane model which eliminates electrical leads running through the model to provide current for incandescent lights at widely disposed points and which provides the

2 light for these widely disposed points from one central source housed within the model.

Other objects and advantages of the present invention will become apparent from a consultation of the appended specification and the accompanying drawings, in which:

Figure 1 is a side elevational view of a model of an aircraft having a lighting system, shown in phantom, constructed in accordance with the present invention;

Figure 2 is a top plan view of the same model showing, in phantom, the general layout of the system;

Figure 3 is a front elevational view of the model;

Figure 4 is a perspective view of the lighting block which is the central source of lighting for the lighting system;

Figure 5 is a perspective view of the electrical components associated with the lighting system embodied in the model which are adapted to control the circuit associated with the central lighting source;

Figure 6 is a schematic showing of the circuit embodied in the lighting system of this particular model;

Figure 7 is a detailed showing of the sheathing utilized to prevent the leakage of light from the plastic conduits utilized in the present invention; and Figure 8 is a perspective showing of the window lighting block which is a component part of the lighting system developed for the airplane model.

The present invention is embodied, for purposes of illustration and description, in a display model 10 which comprises an airplane 11 having a fuselage 12 and wings 13. The entire model 10 is formed from a phenol formaldehyde casting resin and is cast in two pieces. In order to increase the verisimilitude of the model there have been incorporated therein simulated running lights with which the airplane, which the model is intended to represent, is equipped. Provisions have also been made for the simulation of the lighting of both the flight deck and the passenger cabin. Since the model is constructed on a comparatively small scale the representation of the various lights embodied in the full scale airplane cannot be accurately made by the incorporation of conventional small-sized incandescent bulbs. For instance, the wing tip section in which the wing running lights of the model would have to be installed is of such small dimensions that the smallest incandescent bulb readily obtainable would be too large in size to accurately represent the appearance of the actual lights or to fit within the dimensional limits of the wing tip. Further, the installation of electrical leads throughout the interior of the model is a time consuming and expensive operation in a model of such small overall size as the one in which the lighting system under discussion is embodied.

In the present model there are simulated port and starboard wing tip running lights 14 and 15, tail section running lights 17 and 18, running light 16 in the top of the fuselage 12, flight deck lights 19 and lighted cabin window 20. All of the running lights (14, 15, 16, 17 and 18) are represented by the ends of plastic light conductive tubes which are imbedded in the body of the model itself. For instance, the end of light-conductive plastic tube 46 simulates running light 14 and the end of plastic tube 47 simulates running light 15. Light conductive tubes 48 and 49 provide tail section running lights 17 and 18 and the end of plastic tube 45 serves as a running light 16 for the top of the fuselage 12. The ends of the light-conductive plastic tubes are shaped to represent the conformation of the actual running lights and the surface of the plastic is abraded to attain maximum light diffusion. The colors of the lights are achieved by treating the ends thereof with a plastic dye in appropriate colors. It is, of course, conceivable that the ends of the tubes in other applications of the present invention could be shaped in a variety of ways to simulate the appearance of the illuminated object represented. Plastic tube 44 runs forward to the flight deck lights 19 and simulates the illumination of the flight deck which consists of a block 19a of plastic possessing luminous qualities. It is intended that the light-conductive tubes and flight deck be formed of a plastic possessing such luminous qualities. Methylmethacrylate, which is a polymerized derivative of methacrylic acid possesses such light-conducting characteristics and is utilized in the construction under consideration. To accurately represent the dim light characteristic of the flight deck the end of plastic tube 44 so conducts light into plastic block 19a as to considerably reduce the overall intensity of the lighting.

The model is supported by a stand 21 which comprises a standard 22 and a base 23. The upper end 24 of standard 22 is slightly bent to permit the assumption of a realistic attitude by the model and has mounted thereupon a lighting block 25 which provides a central source of illumination for the entire model. Lighting block 25 is of roughly rectangular configuration and is comprised of two symmetrical halves which are retained upon the upper end 24 of standard 22 by means of screw or similar fasteners 26. The forward end 27 of lighting block 25 is formed in the shape of a reverse E with the arms of the E forming receptacles for incandescent bulbs which are housed therebetween. An upper receptacle 30 provides a housing for incandescent bulb 33 and a lower receptacle 34 provides a housing for incandescent bulb 35. At the rear of the housing there is formed an upper U-shaped receptacle 36 which provides a housing for incandescent bulb 37 and a lower circular-shaped receptacle 38 which provides a housing for incandescent bulb 39. It is, of course, conceivable that means of illumination other than incandescent bulbs might be utilized in conjunction with the present invention and it is not intended to limit the use of the invention thereto.

As can be seen from the drawings, the entire lighting block or central lighting source 25 is adapted to be inserted into a receptacle formed in the body of the model 10. The body of model 10 is formed or cast from a phenol formaldehyde casting resin and the plastic light-conductive tubes referred to above are cast into the interior of the model at the time when the model itself is cast. Thus, the light-conductive tubes are imbedded in an opaque substance which would ordinarily leach the light from the tubes during the passage of the light to the point where it is intended to emanate from the ends of the tubes. To prevent such an occurrence, each of the tubes (Figure 7) is wrapped in tin or aluminum foil 52 and then wound with tape 53 to prevent the possibility of light leaking from the tube and to conserve to the greatest extent possible the light-conductive characteristics of the tube. A typical tube 48 is shown with the foil sheathing 52 and the tape winding 53.

As indicated above, central lighting source or block 25 provides the only means of lighting the entire model. Juxtaposed to the ends of rods 46 and 47 is incandescent bulb 35. The light from bulb 35 is conducted through the rods 46 and 47 to the respective ends thereof and the port and starboard lights 14 and 15 are thereby simulated. The end of plastic tube 45 is juxtaposed to incandescent bulb 37 and the light from bulb 37 is conducted through tube 45 to simulate the running light 16 on the top of the fuselage 12. The end of plastic tube 48 is also juxtaposed to the incandescent bulb 37 and light is conducted through it to simulate the appearance and function of tail section running light 17. The end of plastic tube 49 is juxtaposed to incandescent bulb 39 permitting light to be conducted therethrough to simulate the function and appearance of tail section running light 18.

Molded into the phenolic body of the model 10 is a window lighting block 42 which is roughly rectangular in configuration and has a central cut 43 made therein which forms two longitudinally extending legs 43a and 43b. Window lighting block 42 is formed of light-conductive plastic and is wrapped in foil and tape in a manner similar to that in which the light-conductive tubes are wrapped. However, the forward wall 54 of the cut 43 is left unwrapped and the window lighting block 42 is molded into the body of the model 10 simultaneously with the molding-in of the light-conductive tubes. The plastic light-conductive elements can be successfully molded in the phenolic body of the model because the coefficients of expansion of both the plastic composing the body and the light-conductive elements are the same.

The receptacle in the body of the model which is provided for the reception of central lighting source or block 25 is straddled by the legs 43a and 43b of window lighting block 42. Therefore, unwrapped forward wall 54 of cut 43 is juxtaposed to incandescent bulb 33. Thus, light is permitted to enter the window block 42 and the removal of the shielding foil and tape from the sides of the block after the casting of the model will permit the simulation of a band of light along the side of the fuselage to enhance the realistic effect. Windows 20 are defined by vertical strips 20a which are painted or otherwise indicated over the sides of the block to indicate the channels between the windows. Thus, the appearance of lighted windows of an airplane cabin is achieved.

The plastic rod 44 whose forward end is in direct contact with the plastic block 19a which simulates the window lighting of the flight deck 19 has its rear end juxtaposed to the front wall 42a of the window lighting block 42. Thus, a portion of the light which is transmitted from bulb 33 is channeled to the plastic block 19a and the illumination of the flight deck is realistically imitated.

The electrical components which serve to actuate the bulbs incoporated in the central lighting source 25 are housed on a base plate 56 within the base housing 55. A socket 57 is provided on the base plate 56 for the mounting of the lower end of standard 22. Arranged on the base plate 56 is a transformer 59 into which electrical power is fed by means of leads 58. Associated with the transformer are a resistor 60, a relay 61 and a thermal-switch 62 which constitute a thermal-relay adapted to control the flashing of bulbs 33, 35, 37 and 39. Bulb 35 which provides the light for port and starboard running lights 14 and 15 is flashed on and off to simulate realistically the actual flashing of the wing tip lights of its larger counterpart. Since the lights in the cabin and on the flight deck are constant the bulb 33 remains on steadily. Bulbs 37 and 39 are flashed intermittently to permit alternate lighting of tail section lights 17 and 18 and the running light 16 on the top of fuselage 12. Appropriate electrical leads 63 running upwardly from the base 23 through the standard 22 conduct electrical current to the central lighting source 25.

By the use of the lighting system described above there is provided a central lighting source by means of which a number of remotely disposed lights can be illuminated through the medium of one bulb. Thus, genuine economies can be made because special minute-sized bulbs need not be resorted to to simulate the light of the actual counterpart of the model. Further, the running lights can be reproduced on a scale proportionate to the overall scale of the model since the ends of the light transmitting tubes can be reduced to any desired size. The intensity of illumination achieved is usually in direct proportion to the size of the model and an unrealistic effect of extreme brightness may be avoided. The central source may easily be servcide by removing it from the receptacle within the interior of the body of the model 10.

Having described the invention, what is claimed as new and useful and desired to be secured by Letters Patents of the United States is:

1. A display airplane model comprising a fuselage and wings formed of an opaque material, a flight deck portion in said fuselage formed of a light-transmitting material, a window lighting block embodied in said fuselage and formed of a light-transmitting material, a light source contained in said fuselage, and a plurality of means formed of light-transmitting material, said means comprising a pair of elongated members embedded in said fuselage, each having an end juxtaposed adjacent said light source and extending to the rearward end of the fuselage adjacent the tail section to expose the terminal ends thereof, a second pair of elongated members, each embedded for most of their length within a wing, and each having an end disposed adjacent the light source and a terminal end located at the tip of a wing, and an elongated member extending from said light source to said flight deck portion for conducting light thereto for illumination thereof.

2. A display airplane model comprising a fuselage and wings formed of an opaque plastic material, a flight deck portion in the forward end of said fuselage formed of a light transmitting material, a window light block embodied in the central portion of said fuselage and formed of a light transmitting material, a light source contained in said fuselage juxtaposed to said window light block, said light source comprising a block means having a plurality of incandescent bulbs mounted thereon, and a plurality of means formed of light transmitting material, said means comprising a pair of elongated members embedded in said fuselage, each having an end juxtaposed adjacent said light source and extending to the rearward end of the fuselage adjacent the tail section to expose the terminal ends thereof, a second pair of elongated members, each embedded for most of their length within a wing, and each having an end disposed adjacent said light source and a terminal end located at the tip of a wing, and an elongated member extending from said light source to said flight deck portion for conducting light thereto for illumination thereof.

RICHARD TALBOT CLARKE.

REFERENCES CITED

The following references are of record in the file of this patent:

UNITED STATES PATENTS

| Number | Name | Date |
|---|---|---|
| 1,706,161 | Hollnagel | Mar. 19, 1929 |
| 1,921,614 | Frei | Aug. 8, 1933 |
| 1,965,865 | Thompson | July 10, 1934 |
| 2,242,536 | Montgomery | May 20, 1941 |
| 2,308,844 | Wilshusen | Jan. 19, 1943 |
| 2,316,589 | Iwanowicz | Apr. 13, 1943 |
| 2,367,858 | Flynn | Jan. 23, 1945 |